(12) United States Patent
Swindell et al.

(10) Patent No.: US 8,001,686 B2
(45) Date of Patent: Aug. 23, 2011

(54) METHOD FOR TAUT SHEATH SPLICING OF ALL-DIELECTRIC, SELF-SUPPORTING FIBER OPTIC CABLE

(75) Inventors: Guyton P. Swindell, Simpsonville, SC (US); Douglas M. Duke, Simpsonville, SC (US); Mark A. Boxer, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 1383 days.

(21) Appl. No.: 10/607,646

(22) Filed: Jun. 27, 2003

(65) Prior Publication Data

US 2004/0261264 A1   Dec. 30, 2004

(51) Int. Cl.
*H01R 43/00* (2006.01)
(52) U.S. Cl. ............................................. 29/869; 29/868
(58) Field of Classification Search .................... 29/869, 29/748, 754, 755, 868; 385/100, 134, 135
See application file for complete search history.

(56) References Cited

U.S. PATENT DOCUMENTS

| | | | | |
|---|---|---|---|---|
| 5,133,039 | A | * | 7/1992 | Dixit .............................. 385/135 |
| 5,322,973 | A | | 6/1994 | Dagan .............................. 174/92 |
| 5,353,366 | A | * | 10/1994 | Bossard ........................ 385/134 |
| 5,647,046 | A | | 7/1997 | Cowen et al. .................. 385/136 |
| 5,692,299 | A | | 12/1997 | Daems et al. .................... 29/869 |
| 5,696,864 | A | * | 12/1997 | Smith et al. .................... 385/135 |
| 5,867,624 | A | | 2/1999 | Forrester et al. ............. 385/134 |
| 6,049,648 | A | | 4/2000 | Stokes et al. |
| 6,173,103 | B1 | | 1/2001 | DeFrance ...................... 385/136 |
| 6,195,487 | B1 | | 2/2001 | Anderson et al. |
| 6,236,789 | B1 | | 5/2001 | Fitz |
| 6,311,006 | B1 | | 10/2001 | Forrester et al. ............. 385/134 |
| 6,389,213 | B1 | | 5/2002 | Quesnel ........................ 385/136 |
| 6,483,977 | B2 | | 11/2002 | Battey et al. .................. 385/135 |
| 2002/0034369 | A1 | | 3/2002 | Forrester et al. ............. 385/134 |
| 2003/0081396 | A1 | | 5/2003 | Smith ........................... 361/801 |

* cited by examiner

*Primary Examiner* — Thiem Phan
(74) *Attorney, Agent, or Firm* — Sughrue Mion, PLLC

(57) ABSTRACT

A method of splicing a fiber optic cable including applying a clamp to a first portion of a fiber optic cable, using a bail to connect the clamp to a support structure, connecting a splice closure to the bail, connecting an aerial splicing platform to the bail and splicing a second portion of the fiber optic cable to a second fiber optic cable in the splice closure.

7 Claims, 3 Drawing Sheets

METHOD FOR TAUT SHEATH SPLICING OF ALL-DIELECTRIC, SELF-SUPPORTING FIBER OPTIC CABLE

FIELD OF THE INVENTION

This invention relates to an apparatus for splicing fiber optic cable, and more specifically, to apparatus for splicing all-dielectric, self-supporting (ADSS) fiber optic cable.

BACKGROUND OF THE INVENTION

Fiber optic cables are widely used in communications systems. Communications services are typically provided to specific customers by splicing drop cables to feeder cables.

For years, users of fiber optic cables lashed to messenger wires have used the technique of "taut sheath splicing" to splice cables used to drop service to specific customers. The taut sheath splicing technique is attractive because it enables a user to splice in the drop cable without predetermining splice points or slack coils. The technique is currently performed only with messenger supported fiber optic cables, that is, cables having a messenger, typically a steel cable, as the supporting element. The optical fibers can be either lashed to a messenger, or embedded in a "figure 8" type cable with the messenger and fiber optic cable extruded together into a "figure 8" form.

All-dielectric, self-supporting (ADSS) fiber optic cable contains no metal, and uses aramid yarns or other non-metallic strength members to minimize the amount of strain experienced by the fibers during their lifetime. Devices that are used to connect the cables to supporting structures must grip the cables in a manner such that the tensile load from the cable is properly transferred from the cable strength members through the cable sheath to the supporting structure, without damaging the optical fibers.

ADSS cable has inherent benefits over lashed systems. Since the ADSS installation only requires the installation of a single cable, the installation method is faster, and therefore less expensive than the two-part installation of a lashed system. ADSS cable can more easily be deployed in the "supply" zone of the pole, making it very attractive for use by groups, such as municipalities, that have access to the supply area of the pole. The metal-free, dielectric design eliminates bonding and grounding of the cable. In addition, there is minimal maintenance required for the ADSS system, relative to a lashed system.

One reason that taut sheath splicing has not been performed on ADSS cable is an industry perception that traditional ADSS needed a deadend built into each end of the splice closure, turning the closure into a structural member.

Another reason is the industry perception that an ADSS cable must be lashed within the span in the vicinity of the splice, thereby dramatically increasing the cost of the installation and decreasing the flexibility of the installation.

There is, therefore, a need for an improved apparatus for permitting splicing all-dielectric, self-supporting fiber optic cable.

SUMMARY OF THE INVENTION

An apparatus for splicing a fiber optic cable constructed in accordance with this invention comprises a clamp for clamping a first portion of a first fiber optic cable, a bail for connecting the clamp to a support structure, a splice closure for splicing a second portion of the first fiber optic cable to one or more additional fiber optic cables, and means for connecting the splice closure to the bail.

The bail can comprise a metallic cable. The clamp can comprise a frame having first and second side plates, wherein each of the side plates defines a tapered groove, and first and second wedges are positioned in the side plate grooves. The splice closure can be positioned away from the clamp to maintain a minimum bend radius in the first fiber optic cable, both during the splicing operation and once the splicing operation is complete.

This invention is particularly applicable to splicing all-dielectric, self-supporting (ADSS) fiber optic cable.

In another aspect, the invention encompasses a method of splicing a fiber optic cable, the method comprising the steps of: applying a clamp to a first portion of a first fiber optic cable, using a bail to connect the clamp to a support structure, connecting a splice closure to the bail, connecting an aerial splicing work platform to the bail, and splicing a second portion of the first fiber optic cable to a second fiber optic cable in the splice closure.

DETAILED DESCRIPTION OF PREFERRED EMBODIMENTS

Figure 1:
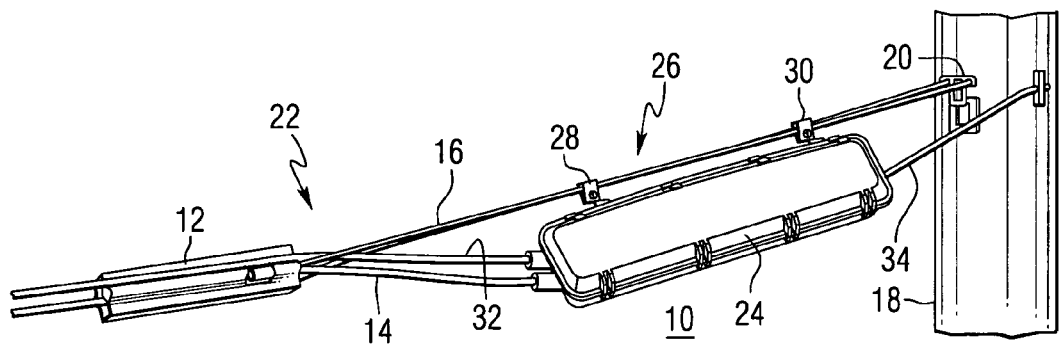
FIG. 1 is a pictorial representation of an apparatus constructed in accordance with this invention.

This invention provides an apparatus and method for splicing all-dielectric, self-supporting fiber optic cable. Referring to the drawings, FIG. 1 is a pictorial representation of an apparatus 10 constructed in accordance with this invention. The apparatus includes a wedge type clamp 12 for gripping a first fiber optic cable 14, which may be a feeder cable. A bail 16 is provided for connecting the clamp to a support structure 18 using a guy attachment 20. The clamp 12 and bail 16 form a deadend assembly 22. A splice closure 24 is connected to the bail 16 by a connection means 26 in the form of clamps 28 and 30. The first fiber optic cable 14 extends through the clamp 12 and into a first end of the closure 24. A second fiber optic cable 32 also extends into the first end of the enclosure 24. The taut-sheath splice provides access to specific fibers inside a fiber optic cable without severing the entire cable. For example, if cable 14 includes numerous fibers, one or more of those fibers can be extracted from cable 14 and spliced to cable 32. Meanwhile, the remaining unsevered fibers in cable 14 continue through the right hand side of the closure in the portion of the cable designated as 34 in FIG. 1. The closure is positioned a sufficient distance from the clamp so that a minimum bend radius can be maintained in the portions of the fiber optic cables 14 and 32 lying between the clamp and the closure. The minimum bend radius is specified on the cable documentation, and will vary by cable type. The installer would be aware of the bend radius constraints of a particular cable and would position the closure accordingly.

Figure 2:
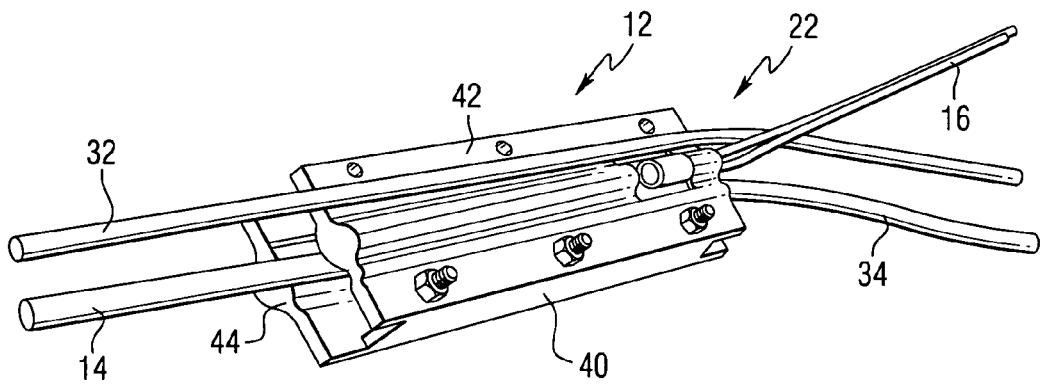
FIG. 2 is a pictorial representation of a clamp portion of a deadend assembly used to support a fiber optic cable.

The deadend assembly 22 includes the wedge clamp 12 and the bail 16. The wedge deadend and secured bail can be attached to support structures such as poles or towers. FIG. 2 is a pictorial representation of the deadend assembly 22. The wedge clamp includes a frame 40 with an attached cable bail for mounting to the support structure. The frame includes two side plates 42 and 44. Each plate has two slots that are tapered and angled toward one another. Two wedges slide into the slots in the frame. The wedges are similarly tapered, enabling them to be interlocked with the side plates. Each wedge also has a groove that is sized and textured to grip the cable 14. The wedges can be designed to apply pressure to the cable evenly along the entire contact surface of the wedge, or with varying force along such surface. The actual size of wedge deadend depends on the specific application for which it will be used.

As cable load is applied to the wedge deadend, wedges in the clamp slide forward in a frame and tighten around the cable. These wedges grip the cable in proportion to the load on the cable. That is, the greater the cable load, the higher the load applied to the cable to secure it. The wedges do not slide back when the load is released, thus, oscillating loads will not loosen the wedges because they are literally wedged into the frame. The shallow taper of the wedges allows them to move forward in the frame significantly as the cable is loaded. By making this angle shallow, the compressive force that the wedges place on the cable for a given cable load, and hence the tensile force placed on the frame, is increased. The normal force of the wedges on the frame slots creates a friction force that locks the wedges in place. At the same time, the shallow angle decreases the tendency of the wedges to slide back out of the frame. Note that lubrication can be applied to the sliding surfaces to facilitate the wedges moving forward in the frame when the cable is loaded. The wedge deadend is designed so as to hold the cable with enough force to prevent cable slippage, but not enough force so as to damage the cable jacket or to diminish optical performance of the cable. Further, the design of the deadend permits the frame to easily be opened and closed without the use of tools. A wedge type deadend is disclosed in U.S. Pat. No. 5,647,046, which is hereby incorporated by reference. In this invention, the deadend includes an extended bail that supports a splice closure. The clamping mechanism portion of the deadend can be constructed in accordance with known designs.

Cable 32 is a drop cable that is connected to the feeder cable 14 in the splice closure 24. Fiber optic cable 34 can be a section of cable 14 or a separate fiber optic cable that is spliced to cable 14 in the splice closure. Ordinarily, a single drop cable would have exited on the side of the pole. However, where multiple drop cables are used, cable 32 would have led to a slack-storage device which would have reversed its direction and brought it back to the pole.

Figure 3:
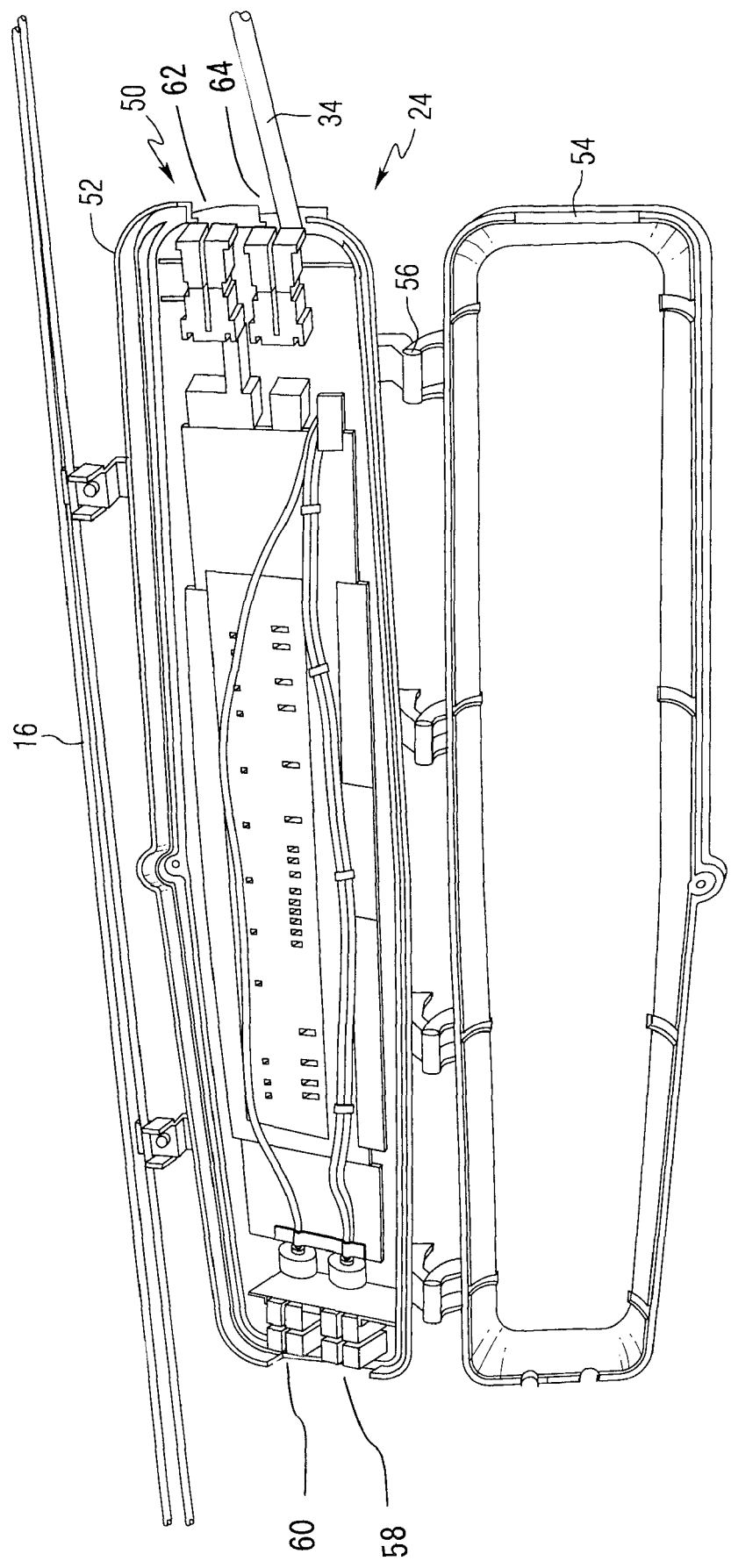
FIG. 3 is a pictorial representation of the splice closure of the apparatus of FIG. 1.

FIG. 3 is a pictorial representation of splice closure 24 of FIG. 1. The closure comprises a housing 50 having two sides 52, 54 connected by hinges 56. Ports 58, 60, 62 and 64 are provided at the ends of the housing so that fiber optic cables can pass though the ports. Splices can then be made within the closure.

Figure 4:
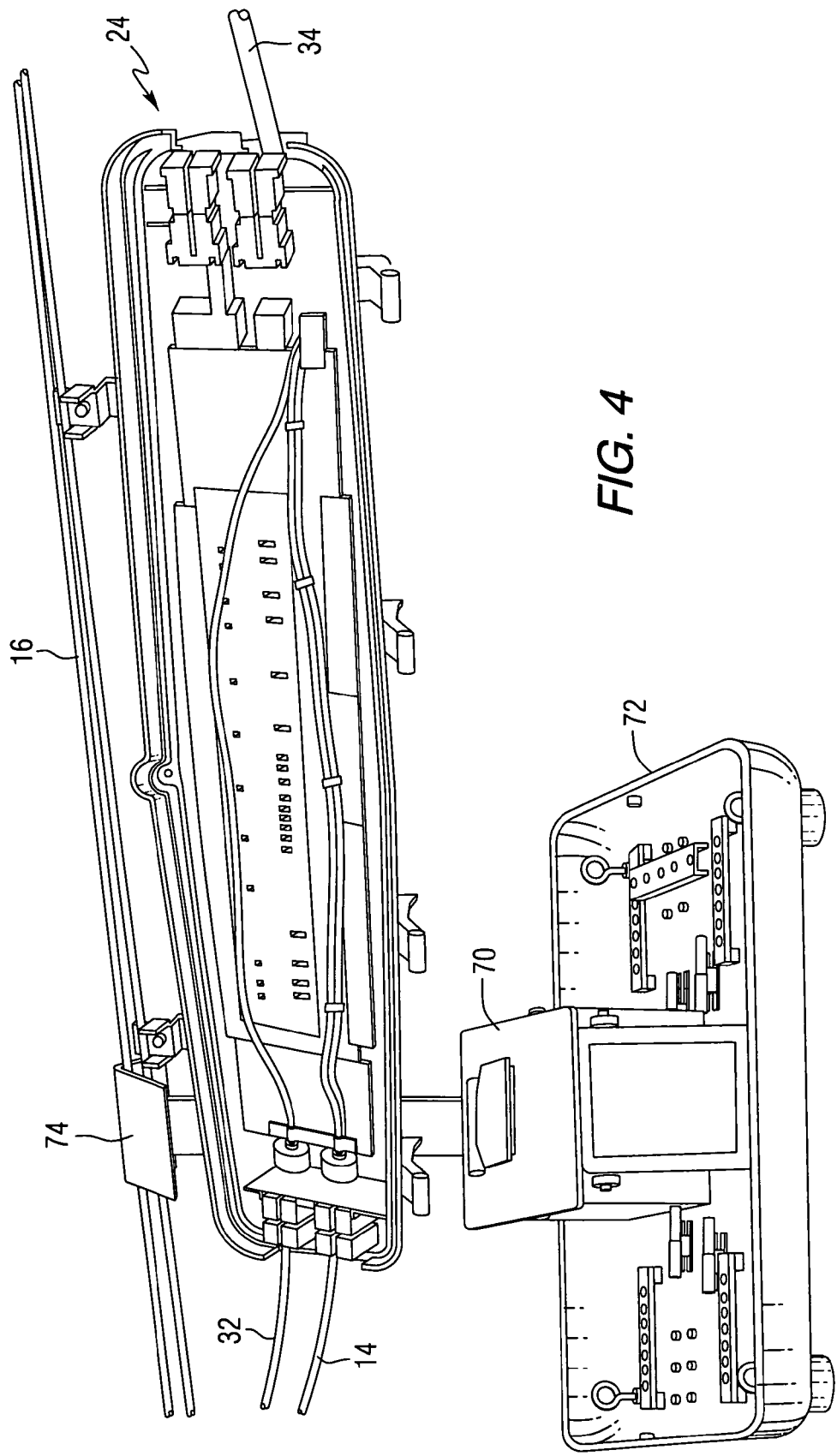
FIG. 4 is a pictorial representation of a splice enclosure in combination with a fusion splicer that can be used in an apparatus constructed in accordance with this invention.

FIG. 4 is a pictorial representation of the splice closure 24 in combination with a fusion splicer 70 that can be used in an apparatus constructed in accordance with this invention. The fusion splicer 70 is supported by a tray 72 that can be connected to the bail by a connection means 74. The fusion splicer, tray, and connection means form an aerial splicing workstation.

This invention incorporates the use of an aerial taut sheath closure with wedge-type ADSS cable deadend hardware. Taut sheath splicing of ADSS fiber optic cable can be performed without including any planned extra cable at installation.

The splice closure is attached at the pole location to the bail of the deadend. The extended bail enables attachment of the weather-tight closure, and releases the cable tension over a sufficient distance to enable the taut-sheath splice. The long bail allows flexibility for the location of the aerial splicing workstation, and smoothes the bends of the cable as they come from the deadend clamp into the splicer and splice closure. The splice closure is designed to be compatible with "taut sheath" applications. The splice can be performed with a fusion splicer supported by the bail of the deadend.

Since ADSS cable has not been spliced using taut sheath methods in the past, a significant advantage of this invention is that it allows splicing of ADSS cables without predefining the splice locations, and accommodating them by incorporating extra cable during installation at those locations. This advantage is particularly important for markets that require multiple drops to subscribers, such as for networks within a city or municipality, and for fiber to the home (FTTH) or fiber to the subscriber applications. Since each predefined splice location also entails deploying extra cable and a storage method, this invention provides significant material and labor savings for the user. The capability of taut sheath splicing significantly decreases the amount of prior planning needed when deploying a network, thereby saving significant amounts of engineering time and increasing the flexibility of the network, while also keeping the inherent benefits of ADSS cable as described above.

In addition to the apparatus described above, the invention encompasses a method of splicing a fiber optic cable. The method comprises the steps of: applying a clamp to a first portion of a first fiber optic cable, using a bail to connect the clamp to a support structure, connecting a splice closure to the bail, connecting an aerial splicing platform to the bail, and splicing a second portion of the first fiber optic cable to a second fiber optic cable in the splice closure.

This invention is particularly applicable to splicing all-dielectric, self-supporting (ADSS) fiber optic cable. The ADSS cable can include a plurality of optical fibers which can be accessed without severing the ADSS cable or requiring additional slack in the ADSS cable to perform a splice.

While particular embodiments of the invention have been described in detail for the purposes of illustration, it will be evident to those skilled in the art that numerous variations may be made to the disclosed embodiments without departing from scope of the invention as defined in the appended claims.

What is claimed is:

1. A method of splicing a fiber optic cable comprising:
applying a clamp to a first portion of a self-supporting first fiber optic cable;
using a bail to connect the clamp to a support structure;
connecting a splice closure to the bail;
connecting an aerial splicing platform to the bail; and
splicing a second portion of the self-supporting first fiber optic cable to a second fiber optic cable in the splice closure;
wherein said self-supporting first fiber optic cable does not pass through said bail.

2. The method of claim 1, wherein the splice closure is positioned away from the clamp to maintain a minimum bend radius in the self-supporting first fiber optic cable.

3. The method of claim 1, wherein the self-supporting first fiber optic cable is an all-dielectric, self-supporting (ADSS) fiber optic cable.

4. The method of claim 1, wherein the self-supporting first fiber optic cable comprises:
an ADSS cable including a plurality of optical fibers which can be accessed without severing the self-supporting first fiber optic cable or requiring additional slack in the self-supporting first fiber optic cable to perform a splice.

5. The method of claim 1, wherein splice points or slack coils are not predetermined prior to applying the clamp to a first portion of a said self-supporting first fiber optic cable and using a bail to connect the clamp to a support structure.

6. The method of claim 1, wherein the splicing method is a taut sheath splicing method.

7. A method of splicing a fiber optic cable comprising:
applying a clamp to a first portion of a self-supporting first fiber optic cable;
using a bail to connect the clamp to a support structure;
connecting a splice closure to the bail;
connecting an aerial splicing platform to the bail; and
splicing a second portion of the self-supporting first fiber optic cable to a second fiber optic cable in the splice closure;
wherein said bail is not connected to said self-supporting first fiber optic cable.

* * * * *